3,271,414
PREPARATION OF BENZOFURAN, BENZO-
THIOPHENE, AND INDOLES
Gerrassimos Frangatos, Princeton, N.J., assignor to Mobil
Oil Corporation, a corporation of New York
No Drawing. Filed May 12, 1964, Ser. No. 366,889
8 Claims. (Cl. 260—319.1)

This invention relates to improved processes for the catalytic oxidative dehydrocyclization of substituted aromatic compounds to bring about ring closure and to thereby produce hetrocyclic compounds having nitrogen, oxygen or sulfur in the heterocyclic rings. More specifically, the invention is concerned with the application of these methods to the production of various indoles from alkyl-substituted anilines.

Many of the heterocyclic organic compounds, as illustrated by the indoles, are important chemicals in modern industry, useful as such, but even more valuable for the production of their derivatives. Many methods have been used or suggested for the manufacture of these heterocyclics, usually involving multi-step procedures which may be too involved to be commercially economical, or which may require expensive raw materials, high-priced noble metal catalysts, and, all too frequently, with relatively low yields.

It is one of the objects of this invention to provide simple and economical processes for the production of heterocyclic compounds. It is another object to prepare such compounds in good yields. It is still another object to prepare these compounds by processes permitting ready separation and recovery of the desired compounds from other reaction products. It is a further object to direct these processes selectively toward maximum production of the heterocyclics. It is yet another object to prepare indoles from alkyl-substituted anilines.

These and other objects are attained by subjecting substituted aromatic compounds to catalytic oxidative cyclo-dehydrogenation at elevated temperatures. This process is carried out by passing a mixture of oxygen and the aromatic compound over a special dehydrocyclization catalyst supported by an inert carrier, in a heated reactor. The effluents from the reaction zone are condensed in a cooled receiver and the desired heterocyclic compound is recovered from the condensate.

The processes of the present invention are applied to many different aromatic compounds as initial reactants. These compounds may be characterized as alkyl-substituted aromatic compounds having the formula

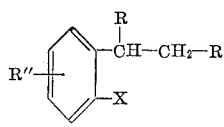

in which R is selected from the group consisting of hydrogen and alkyl groups of up to six carbon atoms, and in which X is a member of the group consisting of —$NH_2$, —NHR', —SH, —OH, where R' is a hydrocarbon radical selected from acyclic and cyclic groups containing up to eight carbon atoms, and in which R" is hydrogen, nitro-, alkoxy-, halogen, cyano-, dialkyl-amino-, or a hydrocarbon radical selected from acyclic and cyclic radicals having up to eight carbon atoms. As is evident, the group "X" is adjacent (ortho) to the alkyl group set out in the formula whereby formation of a heterocyclic nucleus is brought about between these two groups by the dehydrocyclization process of the present invention. The heterocyclic nucleus may contain nitrogen, sulfur or oxygen in the ring, depending on the composition of the starting reactant.

Illustrative aromatic compounds which may be used as starting reactants include o-ethylaniline and o-isopropyl-aniline, and lower N-alkyl (i.e., containing 1–6 carbon atoms) derivatives such as N-methyl-o-ethylaniline, N-methyl-o-isopropylaniline, N-ethyl-o-ethylaniline, N-ethyl-o-isopropylaniline, N-propyl-o-ethylaniline, and N-isobutyl-o-isopropylaniline. Non-limiting examples of other starting reactants are o-(n-butyl)-aniline; 2–6 diethyl-aniline; o-(1-methylbutyl)-aniline; o-hexylaniline; o-(1-ethylethyl)-aniline; N-methyl - o - (1-propylethyl)-aniline; N-butyl-o-amylaniline; and N-propyl-o-(1-butyl-propyl)-aniline. Likewise, for example, o-ethylphenol may be reacted to produce benzofuran, o-ethyl thiophenol produces thionaphthene, and, similarly, other o-alkyl phenols (e.g., thymol) and o-alkyl thiophenols may be used to produce the corresponding products. Similarly, the catalytic oxidative dehydrocyclization with the catalysts used in the present invention may be applied to a very large number of starting reactants coming within the definitions set forth. As typical, without limitation, there will be described the production of indole from o-ethyl aniline.

A suitable catalyst for the present process may be prepared as follows:

EXAMPLE 1

Vanadium pentoxide (18.19 g., 0.1 mole) is suspended in 120 ml. concentrated hydrochloric acid in a suitable vessel. This reaction mixture is mechanically stirred while being heated to reflux temperature. Stirring and refluxing are continued until a homogeneous dark brown solution of vanadium pentoxide-vanadium oxychloride is obtained. To this solution, concentrated orthophosphoric acid (85.6% aqueous solution) is added (50.5 g., 0.44 mole) dropwise, with continuous stirring and refluxing. Alundum (200 cc.) broken into small pieces is then added to the solution while refluxing and stirring is continued for an additional hour. The reaction mixture is subsequently transferred into a porcelain evaporating dish where a moderate air stream and open flame heating are applied until the phosphorus oxyvanadate impregnated alundum particles are dry and freely flowing.

The production of indole may be carried out by the following illustrative process:

EXAMPLE 2

Forty cc. of the catalyst prepared according to the procedure described in Example 1, is placed in a heat-resistant high-silica glass column of ¾" I.D. to form a catalyst bed which is activated by heating it at 250° C. for 16 hours in an air stream flowing at the rate of 12 liters/hr. The temperature of the bed is then raised to 500° C. while the air flow is adjusted to 8.8 liters/hr. which corresponds to an oxygen flow rate of 0.082 mole/hr. Freshly redistilled o-ethylaniline is concurrently introduced in the reactor at the rate of 8.4 ml./hr. which corresponds to 0.068 mole/hr. The molar ratio of o-ethylaniline:oxygen is 1:1.2. The effluents are removed from the reaction zone by the air stream and are condensed in an ice-cooled conical flask. The condensed contents of the flask consist of indole, water and o-ethylaniline. A 100% material balance is obtained. The indole content in the organic layer is 23.4% by weight and the remaining 76.6% by weight is o-ethylaniline. No other component is found in the organic layer by vapor phase chromatography. The results obtained by vapor phase chromatography are corroborated by fractional distillation of the organic layer. The water simultaneously collected from the reaction zone is 1.25 ml. (0.07 mole). The latter quantity checks well with the theoretical 1.224 ml. (0.068 mole), according to the following reaction scheme:

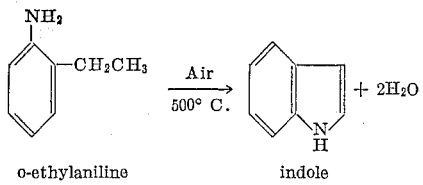

o-ethylaniline          indole

Continuing the reaction for a period of 8 hours with the same conditions, produces indole with the same yield and selectivity, with no decrease in catalyst activity.

In carrying out the process, as exemplified, various temperatures, air flow rates and reaction times may be used for the production of indole. A temperature range of 425–500° C. is preferred for optimal conversion to indole. Temperatures above 600° C. tend, increasingly, to cause undesired cracking of o-ethylaniline to aniline and ethylene. Temperatures as low as 325° C. may be used for the reaction, but with correspondingly lower rate of indole formation.

Oxygen gas, as such, or a free oxygen-containing gas such as air may be used for the oxidative cyclodehydrogenation of o-ethylaniline to indole. Air is effective and generally most convenient and economical. The ratio of oxygen to o-ethylaniline, on a molar basis, may be varied from about 1:1 to about 2.5:1. With the higher ratios of oxygen, the indole content of the effluent increases considerably but beyond a ratio of about 1.5:1, combustion of the o-ethylaniline results to an increasing degree.

A series of tests was carried out, using the procedure of Example 2, except that the oxygen ratios were varied. The results of these tests are shown in Table I, in which column 1 represents the molecular ratios of oxygen ($O_2$) to o-ethylaniline in the mixture fed to the reaction; column 2 represents the percentage, by weight, of indole in the organic layer of effluent condensate; and column 3 repreesnts the material balance, on a percentage basis, as regards the condensed effluent. As shown in Example 2, a 100% material balance was obtained with the organic layer containing 23.4% indole and 76.6% unreacted o-ethylaniline, and the aqueous layer corresponded substantially to the theoretical amount of water resulting from the indole formation. Material balance of less than 100% indicates that some of the o-ethylaniline has been destroyed by combustion.

Table I

| Column 1 | Column 2, percent | Column 3, percent |
|---|---|---|
| 1:1 | 23.3 | 100.0 |
| 1.2:1 | 23.4 | 100.0 |
| 1.5:1 | 24.5 | 98.5 |
| 2.0:1 | 29.8 | 90.0 |
| 2.4:1 | 52.4 | 61.5 |

From these results, it can be seen that the rate of indole formation can be increased with higher oxygen ratios, but at the expense of o-ethylaniline lost. However, the variables can easily be adjusted to give the results desired under each set of conditions. Generally, the ratio of oxygen to o-ethylaniline of 2.5:1 should not be exceeded.

The reactions using starting materials other than o-ethylaniline will generally follow the conditions described for the production of indole. The temperatures of reaction, reaction times, air flow rates and ratios may be varied rather widely to give optimum results but such changes are governed, to a large extent by the characteristics of the starting reactants and the end products. Optimum reaction conditions are easily arrived at in each variation. In general, the ranges set forth for indole formation, cover optimum conditions when the other compounds are substituted for the ethylaniline.

The phosphorus oxyvanadate catalyst may be prepared as shown in Example 1 and activated as shown in Example 2. However, the catalyst may be prepared in any of the various ways known to those skilled in the art. The ratio of phosphorus to vanadium in the catalyst compound may vary, on an atomic weight basis, from about 2.2:1 to about 0.4:1. Optimal results are attained in the range of about 1:1 to about 2.2:1.

Other catalysts may be used in place of the phosphorus oxyvanadate in carrying out the dehydrocyclization reactions of the present invention with the same general degree of effectiveness as illustrated in the examples. Instead of the vanadium pentoxide of Example 1, there may be substituted one or more of the oxides of aluminum, zirconium, cerium, thorium, columbium, tantalum, chromium, molybdenum, manganese, iron, titanium, nickel or cobalt. The procedure of Example 1 is then continued as described to form the corresponding phosphorus oxymetal compound catalyst. Similarly, other soluble compounds of these metals may be used to obtain the desired phosphorus oxymetalate in accordance with well-known chemical principles. The ratios of phosphorus to metal will, on an atomic weight basis, correspond generally with those referred to for the phosphorus oxyvanadate.

The catalysts used in the present invention are preferably carried on Alundum, Carborundum or any other solid inert support which does not adversely affect the desired oxidative cyclodehydrogenation reaction. These catalysts may be used for extended periods of time without losing their effectiveness in this type of reaction. However, should loss in catalytic action occur, the catalysts may be regenerated to full efficiency by heating them for a period of time in an air stream, e.g., as described for activation in the beginning of Example 2. Other catalytic elements such as traces of the noble metals (e.g. Pt, Pd, Au, Ag, etc.) may be included with the named catalyst compounds to modify and improve the efficiency of the catalysts in some cases.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The process of forming benzofuran, benzothiophene, and indole compounds by ring closure, which comprises heating a substituted aromatic compound with oxygen in the presence of a phosphorus oxymetal compound dehydrocyclization catalyst to a temperature sufficient to bring about catalytic dehydrocyclization of the aromatic compound, said aromatic compound having the formula:

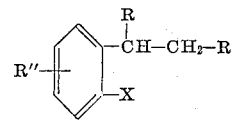

wherein R and R″ are selected from the group consisting of hydrogen and lower alkyl ($C_1$–$C_6$), and X is a member of the group consisting of —$NH_2$, —NHR′, —SH, and —OH where R′ is lower alkyl ($C_1$–$C_6$), and the metal of said phosphorus oxymetal compound catalyst is selected from the group consisting of vanadium, thorium, tantalum, chromium, molybdenum, manganese, iron, nickel, and cobalt.

2. The process of claim 1 in which the aromatic compound is selected from the group consisting of o-alkyl aniline o-alkyl phenol and o-alkyl thiophenol.

3. The process of claim 1 in which the aromatic compound is o-ethylaniline and the reaction product is indole.

4. The process for preparing indole which comprises subjecting o-ethylaniline to oxidative cyclodehydrogenation by passing a mixture of o-ethylaniline with oxygen over a phosphorus oxyvanadate catalyst at a temperature between about 325° C. and about 500° C.

5. The process of claim 3 in which the temperature is between 450–500° C.

6. The process of claim 3 in which the oxygen:o-ethylaniline ratio is below about 2.5:1.

7. The process of claim 3 in which the oxygen:o-ethylaniline ratio is between 1:1 and 2.5:1.

8. The process of preparing indole which comprises subjecting a mixture of oxygen and o-ethylaniline in a ratio of about 1.2:1, to the action of a phosphorus oxyvanadate catalyst at a temperature of about 500° C., condensing the reaction products and recovering indole from the condensate.

References Cited by the Examiner

UNITED STATES PATENTS

| | | | |
|---|---|---|---|
| 2,409,676 | 10/1946 | Gresham et al. | 260—319 |
| 2,953,575 | 9/1960 | Erner et al. | 260—319 |

HENRY R. JILES, *Acting Primary Examiner.*

MARY O'BRIEN, *Assistant Examiner.*